United States Patent [19]
Johnson

[11] Patent Number: 4,712,800
[45] Date of Patent: Dec. 15, 1987

[54] SPLIT ELASTOMER RING FOR REPAIRING POTHEADS AND PROCESS OF REPAIRING A POTHEAD THEREWITH

[76] Inventor: Roy E. Johnson, 12308 Aegean St., Norwalk, Calif. 90650

[21] Appl. No.: 941,322

[22] Filed: Dec. 15, 1986

[51] Int. Cl.⁴ .................. H02G 1/00; H02G 15/23; F16J 15/00
[52] U.S. Cl. .................... 277/1; 174/77 R; 277/9; 277/12; 277/166; 277/216
[58] Field of Search ............. 174/19, 20, 75 R, 75 D, 174/77 R; 277/1, 9, 12, 166, 212 R, 212 C, 216

[56] References Cited
U.S. PATENT DOCUMENTS

| | | | |
|---|---|---|---|
| 1,525,582 | 2/1925 | Hosmer | 277/216 X |
| 1,969,640 | 8/1934 | Curtin | 277/166 X |
| 2,437,900 | 3/1948 | Winkeljohn | 277/166 |
| 2,533,137 | 12/1950 | Neale | 277/166 X |
| 4,622,436 | 11/1986 | Kinnan | 277/1 X |

OTHER PUBLICATIONS

Catalog CA1-10, "Slip-On Terminators", published by G & W Electric Specialty Co., Blue Island, Illinois, Mar. 1968, pp. 1-8.

*Primary Examiner*—Laramie E. Askin
*Attorney, Agent, or Firm*—Edgar W. Averill, Jr.

[57] ABSTRACT

A split elastomeric ring for repairing and sealing electrical connection boxes of the type commonly referred to as potheads. The ring has an elastomeric body and a central opening. A slit is provided in the body of the ring so that it may be opened and inserted around the cable at the base of the pothead. A silicone sealant is placed between the ring and the pothead and the ring holds the sealant against the cable and the base of the pothead body.

9 Claims, 7 Drawing Figures

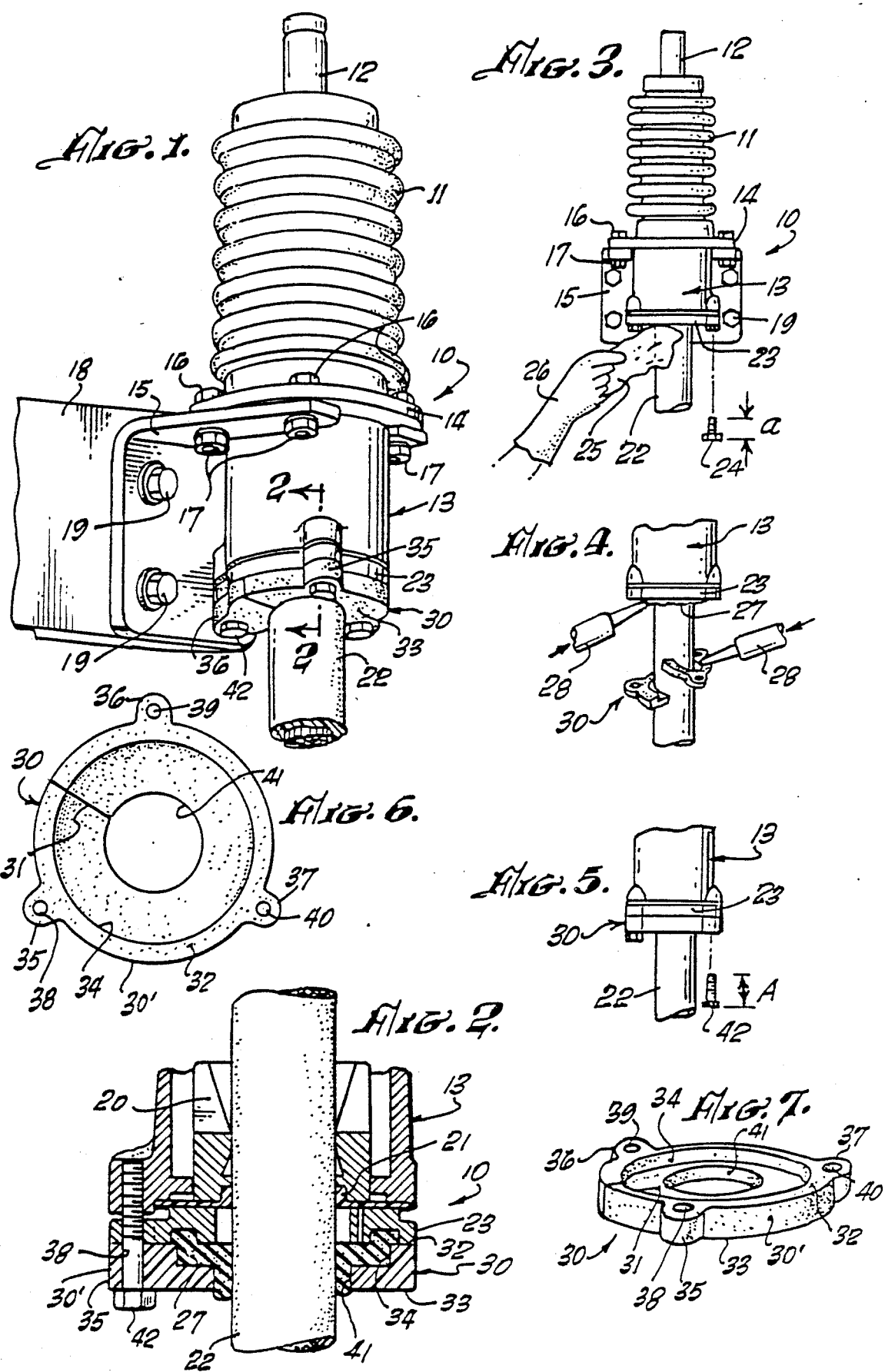

SPLIT ELASTOMER RING FOR REPAIRING POTHEADS AND PROCESS OF REPAIRING A POTHEAD THEREWITH

BACKGROUND OF THE INVENTION

The field of the invention is electrical apparatus and the invention relates more particularly to the maintenance of connectors used in electrical transmission lines.

In order to protect the point of connection of an electrical cable to a transmission line, a housing commonly referred to as a "pothead" is often used for conductor sizes between 750 and 1000 kcmil. A pothead includes an aluminum housing and the insulated cable passes downwardly from the bottom of the housing. The bottom of the housing includes a rubber seal ring which is held to the bottom of the housing by a sealing plate. The pothead housing is filled with a dielectric compound and, when the cable is not oriented directly downwardly from the pothead housing, the dielectric compound can leak out. In order to protect the connection and to prevent further leakage, the pothead often had to be replaced. The cost of replacement involved a substantial cost both in materials and, more importantly, in labor. The transmission line must be de-energized during the repair and this can cause an interruption of service. The amount of time for this service thus should be minimized as much as possible. There is, thus, a need for a method of repairing a pothead from which part of the compound has leaked out which does not involve the entire replacement of the pothead and which can be quickly done.

SUMMARY OF THE INVENTION

It is an object of the present invention to provide a method for repairing potheads from which some of the compound has leaked out.

The present invention is for a split elastomeric ring useful for repairing and sealing electrical connection boxes of the type commonly referred to as potheads. The elastomeric ring has a unitary elastomeric body having an upper surface, a lower surface and an exterior edge. The body further has a generally cylindrical opening in the center thereof. A plurality of bolt openings are concentrically positioned in the body about the generally cylindrical opening. A generally radially directed slit passes from the exterior edge of the body to the generally cylindrical opening whereby the ring may be twisted to open and placed around a cable. The upper surface of the elastomeric ring is capable of holding a sealant against the lower surface of the pothead to be sealed, and the elastomeric body may be held to the base of the pothead by inserting bolts through the bolt openings. The present invention also contemplates the process of using the above-described split elastomeric ring. This process includes the steps of applying a silicone sealant in and around the area where the cable enters a sealing plate at the base of a pothead. Then the bolts which hold the sealing plate to the base of the pothead are removed and an elastomeric split ring is placed around the cable below the area to which the elastomeric sealant has been applied. The split ring is then moved upwardly and secured to the base of the pothead.

BRIEF DESCRIPTION OF THE DRAWINGS

FIG. 1 is a perspective view of a pothead including the split ring of the present invention.

FIG. 2 is a cross-sectional view taken along line 2—2 of FIG. 1.

FIG. 3 is a side view of a pothead prior to the repair thereof.

FIG. 4 is a side view of the lower portion of the pothead of FIG. 1 including the tip of a sealant gun.

FIG. 5 is a side view of the partially repaired pothead of FIG. 4.

FIG. 6 is a plan view of the split elastomeric ring of the present invention.

FIG. 7 is a perspective view of the ring of FIG. 6.

DESCRIPTION OF THE PREFERRED EMBODIMENTS

An electrical connection device of the type generally referred to as a "pothead" is shown in FIG. 1 and indicated generally by reference character 10. Pothead 10 includes a porcelain insulator 11, a connector 12 and an aluminum body 13 which has an upper flange 14. Flange 14 rests on a mounting bracket 15 and is held thereto by a plurality of bolts 16 and nuts 17. Mounting bracket 15 is held to cross member 18 by a plurality of bolts 19.

In order to help keep moisture away from the electrical connection within pothead 10, the interior of the pothead is filled with a special dielectric compound. This dielectric compound is held within the body of the pothead by a stress control ring shown in FIG. 2 and indicated by reference character 20. A diaphragm seal 21 also forms an important part of the seal between the dielectric compound at the space around the insulated conductor or cable 22. Diaphragm seal 21 and the stress control ring 20 are held within the body of the pothead by a sealing plate 23 which is held to the base of the pothead body by a plurality of bolts shown in FIG. 3 and indicated by reference character 24.

The pothead shown in FIG. 1 includes the repaired configuration after use of the split elastomeric ring of the present invention. The process of repairing a leaking pothead is shown best in FIGS. 3, 4 and 5. In FIG. 3, the cable 22 is being wiped clean by a rag 25. It is appropriate to wear a disposable glove 26 to avoid direct contact between the workman's hand and the silicone sealant. The silicone sealant is shown in FIG. 4 and indicated by reference character 27. The rag 25 is used to remove any dust and debris from the cable at the point near the entrance to the pothead. Also, the bottom surface of sealing plate 23 is wiped free of dust and debris. Next, the silicone sealant 27 is applied from a sealant gun 28 at the point where cable 22 passes through sealing plate 23. Bolts 24 are removed from the body 13 of pothead 10. The elastomeric ring of the present invention is then placed about insulated cable 22. The elastomeric ring is shown in plan view in FIG. 6 and indicated by reference character 30. The elastomeric ring 30 has a slit 31 and is fabricated from an elastomer having a shore hardness of about 89A which results in the ring being capable of being twisted open to be inserted as indicated in FIG. 4 while still having sufficient structural integrity to hold the silicone sealant 27 against the sealing plate 23. Slit 31 is preferably located at the midpoint between adjacent bolt openings as shown best in FIG. 6. As shown in perspective view in FIG. 7, elastomeric ring 30 has an outer surface 30', an upper surface 32, and a lower surface, shown best in FIG. 1, and indicated by reference character 33. A generally cylindrical depression is formed in the upper surface 32 and is indicated by reference character 34. This depression 34 forms a pocket to hold the silicone sealant 27 and to hold an amount sufficient to compensate for the movement, expansion or contraction of the elements of the base of the pothead assembly. Ring 30 also has three protrusions indicated by reference characters 35 through 37. Each protrusion has a bolt opening indicated by reference characters 38 through 40.

The stiffness or hardness of the split ring forms an important part of the present invention. It has been found that the use of a polyurethane elastomer having a shore hardness of between 56A and 69D provides a highly successful ring. Elastomers other than polyurethane can, of course, be used.

Ring 30 also has a generally cylindrical opening 41 in the center thereof. It is preferable that opening 41 be larger than the cable about which it is placed. The cables are often skewed from a perfect axial orientation and by providing an opening larger than the cable, the sealant can readily be placed completely about the cable without requiring any straightening of the cable. For instance, with a cable having an outside diameter of 4.5 cm, a preferred diameter of central opening would be about 6 cm.

After the elastomeric ring 30 has been inserted about the cable, as indicated in FIG. 4, the cylindrical depression 34 is also filled with a silicone sealant from sealing gun 28. Then the elastomeric ring 30 is moved upwardly to the position shown in FIG. 5 and new bolts 42 are used to secure ring 30 against the undersurface of sealing plate 23. The reference character "a" is used to indicate the length of the original bolts 24 in FIG. 3 and the reference character "A" is used to indicate the length of new bolts 42 which are increased in length to account for the thickness of elastomeric ring 30. For a typical size of pothead, "A" is one and one-half inches and "a" is one inch. The outer portion of ring 30 preferably has a thickness of between one-half and one inch and the thickness at the generally cylindrical depression 34 is preferably between a quarter of an inch and one-half of an inch.

The result of the process of the present invention is a very efficient repair of a defective pothead. The labor involved is typically about one-half hour as compared to about six hours for the replacement of the pothead. In addition to the cost of the labor, a substantial interruption of electrical service typically results from the repair. By reducing the time which the line is de-energized, the interruption of service is, likewise, reduced in time. The device of the present invention may also be used on potheads which include a dust cover.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A process for sealing the base of a pothead without the necessity of disconnecting the electrical cable therein, said pothead being of the type having a sealing plate on the bottom thereof surrounding the cable extending from the base of the pothead and wherein said sealing plate is held to the body of the pothead by a plurality of bolts, said method comprising the steps of:
    applying a silicone sealant in and around the area where the cable enters the sealing plate;
    removing all bolts which hold the sealing plate to the base of the pothead body;
    twisting open an elastomeric split ring and placing said ring around the cable below the area to which the elastomeric sealant has been applied; and
    moving the split ring upwardly and securing the split ring to the base of the body of the pothead.

2. The process of claim 1 further including the step of wiping any excess silicone sealant from around the pothead and cable.

3. The process of claim 1 wherein said elastomeric split ring has a unitary elastomeric body having an upper surface, a lower surface and an exterior edge, said body further having a generally cylindrical opening in the center thereof, a plurality of bolt openings concentrically positioned in said body about the generally cylindrical opening and a generally radially directed slit passing from the exterior edge of said body to the generally cylindrical opening.

4. The process of claim 3 wherein said split elastomeric ring further includes a generally cylindrical depression in the upper surface of said elastomeric body.

5. The process of claim 3 wherein said slit is located midpoint between adjacent bolt openings.

6. The process of claim 3 wherein said elastomeric ring has a thickness of between one-half and one inch.

7. The process of claim 3 wherein the thickness of said elastomeric ring at the generally cylindrical depression is between a quarter of an inch and a half of an inch.

8. The process of claim 3 wherein said split elastomeric ring has a Shore hardness of between about 56A and 69D.

9. The process of claim 3 wherein said split elastomeric ring is fabricated from a polyurethane elastomer having a Shore hardness of about 89A.

* * * * *